United States Patent
Prosser

(10) Patent No.: US 10,228,692 B2
(45) Date of Patent: Mar. 12, 2019

(54) AIRCRAFT FLIGHT ENVELOPE PROTECTION AND RECOVERY AUTOPILOT

(71) Applicant: Gulfstream Aerospace Corporation, Savannah, GA (US)

(72) Inventor: Kevin Prosser, Savannah, GA (US)

(73) Assignee: Gulfstream Aerospace Corporation, Savannah, GA (US)

(*) Notice: Subject to any disclaimer, the term of this patent is extended or adjusted under 35 U.S.C. 154(b) by 0 days.

(21) Appl. No.: 15/470,776

(22) Filed: Mar. 27, 2017

(65) Prior Publication Data
US 2018/0275651 A1   Sep. 27, 2018

(51) Int. Cl.
| | |
|---|---|
| *B64C 13/16* | (2006.01) |
| *G05D 1/00* | (2006.01) |
| *B64D 45/00* | (2006.01) |
| *B64C 13/18* | (2006.01) |
| *G08G 5/00* | (2006.01) |

(52) U.S. Cl.
CPC ........... *G05D 1/0061* (2013.01); *B64C 13/18* (2013.01); *B64D 45/0005* (2013.01); *G08G 5/0086* (2013.01); *B64D 2045/0085* (2013.01)

(58) Field of Classification Search
CPC .... G05D 1/0061; G05D 1/101; G05D 1/0676; G05D 1/0083; G01C 23/005; G01C 23/00; G01C 5/005; G01C 21/3469; B64C 13/16
See application file for complete search history.

(56) References Cited

U.S. PATENT DOCUMENTS

| | | | |
|---|---|---|---|
| 5,377,937 A * | 1/1995 | LaMay | G05D 1/0676 244/185 |
| 5,892,462 A | 4/1999 | Tran | |
| 6,122,570 A | 9/2000 | Muller et al. | |
| 6,216,065 B1 | 4/2001 | Hall et al. | |
| 6,219,592 B1 | 4/2001 | Muller et al. | |
| 6,236,914 B1 | 5/2001 | Kaloust | |

(Continued)

FOREIGN PATENT DOCUMENTS

| | | |
|---|---|---|
| BR | PI0402378 A | 10/2005 |
| BR | PI0800658 A2 | 9/2009 |

(Continued)

OTHER PUBLICATIONS

International Bureau of WIPO, International Search Report and Written Opinion for Application No. PCT/US2018/012368, dated Jul. 17, 2018.

(Continued)

*Primary Examiner* — Yuri Kan
(74) *Attorney, Agent, or Firm* — LKGlobal | Lorenz & Kopf, LLP

(57) ABSTRACT

Systems and aircraft are provided. An avionics system for an aircraft includes: a trajectory selection module configured to select a potential aircraft path relative to a current aircraft flight condition; a trajectory flight condition module configured to estimate a modeled flight condition of the aircraft along the potential aircraft path; a limit comparison module configured to determine whether the modeled flight condition violates aircraft limits; and a violation indicator module configured to generate an indication of impending violation.

26 Claims, 2 Drawing Sheets

(56) References Cited

U.S. PATENT DOCUMENTS

| | | |
|---|---|---|
| 6,246,929 B1 | 6/2001 | Kaloust |
| 6,282,466 B1 | 8/2001 | Nolte et al. |
| 6,292,721 B1 | 9/2001 | Conner et al. |
| 6,317,663 B1 | 11/2001 | Meunier et al. |
| 6,332,105 B1 | 12/2001 | Calise et al. |
| 6,334,344 B1 | 1/2002 | Bonhoure et al. |
| 6,347,263 B1 | 2/2002 | Johnson et al. |
| 6,421,603 B1 | 7/2002 | Pratt et al. |
| 6,437,707 B1 | 8/2002 | Johnson |
| 6,445,310 B1 | 9/2002 | Bateman et al. |
| 6,452,511 B1 | 9/2002 | Kelly et al. |
| 6,480,120 B1 * | 11/2002 | Meunier ............... G01C 5/005 340/961 |
| 6,484,072 B1 | 11/2002 | Anderson et al. |
| 6,538,581 B2 | 3/2003 | Cowie |
| 6,567,727 B2 | 5/2003 | Westphal |
| 6,567,728 B1 | 5/2003 | Kelly et al. |
| 6,591,170 B2 | 7/2003 | Block et al. |
| 6,643,580 B1 | 11/2003 | Naimer et al. |
| 6,675,076 B1 | 1/2004 | Moody |
| 6,691,004 B2 | 2/2004 | Johnson et al. |
| 6,873,903 B2 | 3/2005 | Baiada et al. |
| 6,889,124 B2 | 5/2005 | Block et al. |
| 6,986,486 B2 | 1/2006 | Darbyshire |
| 7,098,810 B2 | 8/2006 | Bateman et al. |
| 7,120,540 B2 | 10/2006 | Meunier |
| 7,132,960 B2 | 11/2006 | Glover |
| 7,212,917 B2 | 5/2007 | Wilson, Jr. |
| 7,236,104 B2 | 6/2007 | Tran |
| 7,271,741 B2 | 9/2007 | Delaplace et al. |
| 7,295,134 B2 | 11/2007 | Jourdan et al. |
| 7,321,813 B2 | 1/2008 | Meunier |
| 7,366,591 B2 | 4/2008 | Hartmann et al. |
| 7,382,283 B2 | 6/2008 | Delaplace et al. |
| 7,437,246 B2 | 10/2008 | Kelly et al. |
| 7,570,177 B2 | 8/2009 | Reynolds et al. |
| 7,571,878 B2 | 8/2009 | Persson et al. |
| 7,589,646 B2 | 9/2009 | Glover |
| 7,761,193 B2 | 7/2010 | Artini et al. |
| 7,786,900 B2 | 8/2010 | Bitar et al. |
| 7,826,971 B2 | 11/2010 | Fontaine et al. |
| 7,835,866 B2 | 11/2010 | Tzidon |
| 7,844,373 B2 | 11/2010 | Deker |
| 7,899,613 B2 | 3/2011 | Artini |
| 7,899,620 B2 | 3/2011 | Jourdan et al. |
| 7,948,404 B2 | 5/2011 | Tran |
| 8,010,288 B2 | 8/2011 | Bouchet et al. |
| 8,140,264 B2 | 3/2012 | Salmon et al. |
| 8,165,733 B2 | 4/2012 | Caldeira et al. |
| 8,184,020 B2 | 5/2012 | He |
| 8,190,308 B2 | 5/2012 | Pitard et al. |
| 8,195,346 B1 | 6/2012 | Duerksen et al. |
| 8,200,421 B2 | 6/2012 | Botargues et al. |
| 8,214,089 B2 | 7/2012 | Caldeira et al. |
| 8,249,761 B2 | 8/2012 | Persson et al. |
| 8,249,799 B2 | 8/2012 | Flotte et al. |
| 8,355,861 B2 | 1/2013 | Petrini |
| 8,463,461 B2 | 6/2013 | Estkowski et al. |
| 8,483,889 B2 | 7/2013 | Ishihara et al. |
| 8,521,340 B2 | 8/2013 | Coulmeau |
| 8,548,727 B2 | 10/2013 | Kauffman et al. |
| 8,700,231 B2 | 4/2014 | Skarman |
| 8,744,768 B2 | 6/2014 | Gutierez-Castaneda et al. |
| 8,751,070 B2 | 6/2014 | Silly et al. |
| 8,768,556 B2 | 7/2014 | Ben-Arie et al. |
| 8,818,576 B2 | 8/2014 | Maldonado et al. |
| 8,818,577 B2 | 8/2014 | Louise et al. |
| 8,897,935 B2 | 11/2014 | Meunier et al. |
| 8,948,937 B2 | 2/2015 | Constans et al. |
| 8,965,603 B2 | 2/2015 | Baillon et al. |
| 9,002,542 B2 | 4/2015 | Dehais et al. |
| 9,008,870 B2 | 4/2015 | Redmond et al. |
| 9,020,662 B2 | 4/2015 | Felix et al. |
| 9,046,894 B2 | 6/2015 | Bouniol et al. |
| 9,051,058 B2 | 6/2015 | Caule et al. |
| 9,061,756 B2 | 6/2015 | Jang et al. |
| 9,092,980 B2 | 7/2015 | Botargues et al. |
| 9,174,742 B2 | 11/2015 | Nelson |
| 9,177,479 B2 | 11/2015 | Castillo-Effen et al. |
| 9,196,165 B2 | 11/2015 | La Civita et al. |
| 9,199,744 B2 | 12/2015 | Petillon |
| 9,218,002 B2 | 12/2015 | Schulte et al. |
| 9,261,883 B2 | 2/2016 | Ishihara et al. |
| 9,286,807 B2 | 3/2016 | Sundqvist |
| 9,304,514 B2 | 4/2016 | Kozlow et al. |
| 9,315,258 B2 | 4/2016 | Moune et al. |
| 9,405,295 B2 | 8/2016 | Polati De Souza et al. |
| 9,412,072 B2 | 8/2016 | Chi et al. |
| 9,440,747 B1 | 9/2016 | Welsh et al. |
| 9,442,490 B2 | 9/2016 | Mn et al. |
| 9,499,279 B2 | 11/2016 | He et al. |
| 9,536,432 B2 | 1/2017 | Laurent et al. |
| 9,547,993 B2 | 1/2017 | Khatwa et al. |
| 9,587,961 B2 | 3/2017 | Toumazet et al. |
| 9,625,271 B2 | 4/2017 | Ridenour, II |
| 9,633,567 B1 | 4/2017 | Skoog et al. |
| 9,741,254 B2 | 8/2017 | Navarro et al. |
| 9,824,594 B2 | 11/2017 | Lissajoux et al. |
| 9,898,934 B2 | 2/2018 | Wang et al. |
| 9,938,018 B2 | 4/2018 | Welsh et al. |
| 10,008,122 B2 | 6/2018 | Hardt et al. |
| 2002/0161489 A1 * | 10/2002 | Johnson ................ G05D 1/101 701/4 |
| 2003/0107499 A1 | 6/2003 | Lepere et al. |
| 2004/0059474 A1 * | 3/2004 | Boorman ............... G01C 23/00 701/14 |
| 2004/0148103 A1 | 7/2004 | Chiuo et al. |
| 2005/0261811 A1 | 11/2005 | Artini et al. |
| 2006/0158350 A1 | 7/2006 | Glover |
| 2008/0133120 A1 * | 6/2008 | Romanick .......... G01C 21/3469 701/123 |
| 2008/0177429 A1 | 7/2008 | Berglund et al. |
| 2008/0208400 A1 | 8/2008 | Bouchet et al. |
| 2009/0150008 A1 * | 6/2009 | Villaume ............. G05D 1/0083 701/3 |
| 2010/0250032 A1 | 9/2010 | Gremmert |
| 2011/0029162 A1 | 2/2011 | Ishihara et al. |
| 2012/0089375 A1 | 4/2012 | Kordt et al. |
| 2012/0179368 A1 | 7/2012 | Walter |
| 2013/0226373 A1 | 8/2013 | Bollapragada et al. |
| 2014/0121863 A1 * | 5/2014 | Barraci ................ G01C 23/00 701/14 |
| 2014/0358415 A1 | 12/2014 | McDonald et al. |
| 2015/0298821 A1 | 10/2015 | Ishihara et al. |
| 2016/0096616 A1 * | 4/2016 | Li ............................ B64C 13/16 701/3 |
| 2016/0225269 A1 | 8/2016 | Nikolajevic et al. |
| 2016/0232796 A1 | 8/2016 | Oldach |
| 2017/0018192 A1 | 1/2017 | Borgyos |
| 2017/0038223 A1 * | 2/2017 | Toumazet ............ G01C 23/005 |
| 2017/0132942 A1 | 5/2017 | Mere |
| 2017/0139425 A1 | 5/2017 | Miranda de Souza |
| 2017/0301247 A1 | 10/2017 | Sherry et al. |
| 2017/0358226 A1 | 12/2017 | Hodges et al. |
| 2017/0372619 A1 | 12/2017 | Borgyos |

FOREIGN PATENT DOCUMENTS

| | | |
|---|---|---|
| BR | PI1104291 A2 | 10/2013 |
| BR | 102013018346 A2 | 7/2015 |
| CN | 1539125 A | 10/2004 |
| CN | 1666239 A | 9/2005 |
| CN | 101057270 A | 10/2007 |
| CN | 101176133 A | 5/2008 |
| CN | 101228490 A | 7/2008 |
| CN | 101297250 A | 10/2008 |
| CN | 101384974 A | 3/2009 |
| CN | 101939187 A | 1/2011 |
| CN | 102067053 A | 5/2011 |
| CN | 102163061 A | 8/2011 |
| CN | 102163062 A | 8/2011 |

(56) References Cited

FOREIGN PATENT DOCUMENTS

| | | | |
|---|---|---|---|
| CN | 102272553 A | 12/2011 |
| CN | 102331730 A | 1/2012 |
| CN | 102460319 A | 5/2012 |
| CN | 102496313 A | 6/2012 |
| CN | 102541069 A | 7/2012 |
| CN | 102667654 A | 9/2012 |
| CN | 102763049 A | 10/2012 |
| CN | 102859569 A | 1/2013 |
| CN | 102903262 A | 1/2013 |
| CN | 103164617 A | 6/2013 |
| CN | 103287582 A | 9/2013 |
| CN | 103295089 A | 9/2013 |
| CN | 103514360 A | 1/2014 |
| CN | 103847971 A | 6/2014 |
| CN | 104443361 A | 3/2015 |
| CN | 104484717 A | 4/2015 |
| CN | 104991552 A | 10/2015 |
| CN | 105006177 A | 10/2015 |
| CN | 105035335 A | 11/2015 |
| CN | 105116781 A | 12/2015 |
| CN | 105314094 A | 2/2016 |
| CN | 105584627 A | 5/2016 |
| CN | 105608509 A | 5/2016 |
| CN | 105608932 A | 5/2016 |
| CN | 105717937 A | 6/2016 |
| CN | 105874479 A | 8/2016 |
| CN | 106019987 A | 10/2016 |
| CN | 106061842 A | 10/2016 |
| CN | 107031854 A | 8/2017 |
| CN | 107065899 A | 8/2017 |
| CN | 107850459 A | 3/2018 |
| DE | 19831452 C1 | 3/2000 |
| DE | 10005175 A1 | 8/2001 |
| DE | 10046007 C1 | 10/2001 |
| DE | 10065180 A1 | 7/2002 |
| DE | 10225252 A1 | 1/2004 |
| DE | 102004006486 A1 | 8/2005 |
| DE | 102006037899 A1 | 2/2008 |
| DE | 102009032552 A1 | 2/2011 |
| DE | 102010031780 A1 | 1/2012 |
| DE | 202012105058 U1 | 1/2013 |
| DE | 102013201935 A1 | 8/2014 |
| EP | 1196831 B1 | 10/2003 |
| EP | 1057087 B1 | 2/2004 |
| EP | 1240636 B1 | 2/2004 |
| EP | 999485 B1 | 3/2004 |
| EP | 1151429 B1 | 4/2004 |
| EP | 1121678 B1 | 6/2004 |
| EP | 842396 B1 | 9/2004 |
| EP | 1290518 B1 | 1/2005 |
| EP | 1570453 B1 | 4/2006 |
| EP | 1527432 B1 | 5/2006 |
| EP | 1585001 B1 | 9/2006 |
| EP | 1598722 B1 | 9/2006 |
| EP | 1517211 B1 | 10/2006 |
| EP | 1309837 B1 | 12/2006 |
| EP | 1613535 B1 | 1/2007 |
| EP | 1627371 B1 | 6/2007 |
| EP | 1552356 B1 | 7/2007 |
| EP | 1727012 B1 | 11/2007 |
| EP | 1257987 B1 | 12/2007 |
| EP | 1607814 B1 | 12/2007 |
| EP | 1607815 B1 | 12/2007 |
| EP | 1303737 B1 | 2/2008 |
| EP | 989386 B1 | 8/2008 |
| EP | 1812917 B1 | 9/2008 |
| EP | 1369665 B1 | 10/2008 |
| EP | 1780512 B1 | 1/2009 |
| EP | 925518 B1 | 3/2009 |
| EP | 1203201 B1 | 4/2009 |
| EP | 1602994 B1 | 7/2009 |
| EP | 1907911 B1 | 8/2009 |
| EP | 1163534 81 | 9/2009 |
| EP | 1907910 B1 | 10/2009 |
| EP | 1742132 B1 | 12/2009 |
| EP | 1949196 B1 | 12/2009 |
| EP | 1859428 B1 | 1/2010 |
| EP | 1796060 B1 | 2/2010 |
| EP | 2151384 A2 | 2/2010 |
| EP | 1198720 B1 | 3/2010 |
| EP | 1936584 B1 | 3/2010 |
| EP | 1984798 B1 | 4/2010 |
| EP | 2187371 A1 | 5/2010 |
| EP | 1191415 B1 | 4/2011 |
| EP | 2135806 B1 | 5/2011 |
| EP | 1883057 B1 | 6/2011 |
| EP | 2224305 B1 | 10/2011 |
| EP | 1316004 B1 | 12/2011 |
| EP | 2238025 B1 | 4/2012 |
| EP | 1936386 B1 | 5/2012 |
| EP | 2113897 B1 | 9/2012 |
| EP | 2294489 B1 | 10/2012 |
| EP | 2074006 B1 | 3/2013 |
| EP | 2676883 A2 | 12/2013 |
| EP | 2425309 B1 | 3/2014 |
| EP | 1759255 B1 | 4/2014 |
| EP | 2385436 B1 | 8/2014 |
| EP | 2154594 B1 | 10/2014 |
| EP | 2796956 A2 | 10/2014 |
| EP | 1579173 B1 | 11/2014 |
| EP | 2282173 B1 | 2/2015 |
| EP | 2513732 B1 | 5/2015 |
| EP | 2887015 A1 | 6/2015 |
| EP | 2506108 B1 | 8/2015 |
| EP | 2327067 B1 | 11/2015 |
| EP | 2939930 B1 | 11/2015 |
| EP | 1832850 B1 | 12/2015 |
| EP | 2187371 B1 | 1/2016 |
| EP | 2966635 A2 | 1/2016 |
| EP | 2974955 A2 | 1/2016 |
| EP | 3001400 A1 | 3/2016 |
| EP | 3020630 A1 | 5/2016 |
| EP | 3051519 A1 | 8/2016 |
| EP | 3059721 A2 | 8/2016 |
| EP | 2927704 B1 | 10/2016 |
| EP | 3076379 A1 | 10/2016 |
| EP | 2629052 B1 | 12/2016 |
| EP | 2937846 B1 | 3/2017 |
| EP | 2517080 B1 | 4/2017 |
| EP | 1598718 B1 | 5/2017 |
| EP | 2957871 B1 | 5/2017 |
| EP | 3168143 A1 | 5/2017 |
| EP | 1995706 B1 | 6/2017 |
| EP | 2070052 B1 | 9/2017 |
| EP | 2188144 B1 | 10/2017 |
| EP | 2104886 B1 | 11/2017 |
| EP | 3261027 A1 | 12/2017 |
| EP | 1733285 B1 | 1/2018 |
| EP | 3094561 B1 | 2/2018 |
| EP | 2386054 B1 | 4/2018 |
| EP | 2615026 B1 | 4/2018 |
| EP | 2996102 B1 | 4/2018 |
| EP | 3037345 B1 | 7/2018 |
| FR | 2864270 B1 | 2/2006 |
| FR | 2908533 B1 | 12/2008 |
| FR | 2907541 B1 | 1/2009 |
| FR | 2935495 A1 | 3/2010 |
| FR | 2956512 B1 | 3/2012 |
| FR | 2961178 B1 | 3/2013 |
| FR | 2937454 B1 | 1/2015 |
| FR | 2920232 B1 | 2/2015 |
| FR | 2992287 B1 | 5/2015 |
| FR | 3052586 A1 | 6/2015 |
| FR | 2978587 B1 | 3/2016 |
| FR | 3003680 B1 | 12/2016 |
| GB | 2437030 A | 10/2007 |
| GB | 2460954 B | 3/2011 |
| GB | 2444742 B | 6/2011 |
| GB | 2475378 B | 5/2012 |
| GB | 2491693 B | 8/2013 |
| GB | 2546842 A | 8/2017 |

(56) References Cited

FOREIGN PATENT DOCUMENTS

| WO | 2018047042 A1 | 3/2018 |
| WO | 2018100494 A1 | 6/2018 |

OTHER PUBLICATIONS

Igor Alonso-Portillo, et al, Adaptive Trajectory Planning for Flight Management Systems, Technical Report, 2001, AAAI Technical Report SS-01-06, Aerospace Engineering Department, University of Maryland, College Park, MD.

S.G. Bazhenov, et al., Simulation of On-Board Model of Airliner to Evaluate Capability of Trajectories and Flight Safety, Paper, Institute of Control Sciences n.a. V.A. Trapeznikov, Moscow, Russia.

Rushen B. Patel, et al., Real-Time Trajectory Generation for Aircraft Avoidance Maneuvers, AIAA Guidance, Navigation, and Control Conference, Aug. 10-13, 2009, Chicago, Illinois.

Roberto Sabatini, et al, Trajectory Optimisation for Avionics-Based GNSS Integrity Augmentation System, Paper, School of Engineering, RMIT University, Melbourne, VIC Australia, 2016.

Kimberlee Shish, et al., Trajectory Prediction and Alerting for Aircraft Mode and Energy State Awareness, Paper, AIAA 2015-1113, Kissimmee, Florida.

Zhang Yu, et al., Real-Time Trajectory Planning for UCAV Air-To-Suface Attack Using Inverse Dynamics Optimization Method and Receding Horizon Control, Chinese Journal of Aeronautics, 2013, 26(4) 1038-1056, Changsha, China.

* cited by examiner

AIRCRAFT FLIGHT ENVELOPE PROTECTION AND RECOVERY AUTOPILOT

TECHNICAL FIELD

The present disclosure generally relates to aircraft flight envelope protection systems, and more particularly relates to aircraft flight envelope protections systems that model potential aircraft trajectories and test the trajectories for aircraft limit violations.

BACKGROUND

Aircraft are designed to operate within certain operating speeds and loads on control surfaces of the aircraft. These operating limits are known as the flight envelope, outside of which there may be damage or loss of control of the aircraft. In order to protect against operating outside of the flight envelope, conventional aircraft utilize many disparate systems that evaluate individual aspects of the aircraft to determine whether the aircraft is operating outside of the flight envelope or is likely to collide with the ground on the present flight path. These conventional systems, however, have limitations that prevent full envelope protection.

Furthermore, these conventional systems are often disabled for landing based on whether the landing gear is down or by pilot command. Disabling the systems for landing, however, causes the aircraft to lose flight envelope protection during the landing.

Accordingly, it is desirable to provide systems and aircraft that provide greater flight envelope protection during flight and during landing phases. Furthermore, other desirable features and characteristics of the present invention will become apparent from the subsequent detailed description and the appended claims, taken in conjunction with the accompanying drawings and the foregoing technical field and background.

SUMMARY

Systems and aircraft are provided for flight envelope protection. In a first non-limiting embodiment, an avionics system includes, but is not limited to, a trajectory selection module configured to select a potential aircraft path relative to a current aircraft flight condition; a trajectory flight condition module configured to estimate a modeled flight condition of the aircraft along the potential aircraft path; a limit comparison module configured to determine whether the modeled flight condition violates aircraft limits; and a violation indicator module configured to generate an indication of impending violation.

In a second non-limiting embodiment, an aircraft includes, but is not limited to, a sensor system configured to provide aircraft flight condition data, an actuator system configured to manipulate control surfaces of the aircraft, and a control system. The control system includes: a trajectory selection module configured to select a potential aircraft path relative to a current aircraft flight condition; a trajectory flight condition module configured to estimate a modeled flight condition of the aircraft along the potential aircraft path; a limit comparison module configured to determine whether the modeled flight condition violates an aircraft limit; and a violation indicator module configured to generate an indication of impending violation.

BRIEF DESCRIPTION OF DRAWINGS

Advantages of the present invention will be readily appreciated, as the same becomes better understood by reference to the following detailed description when considered in connection with the accompanying drawings wherein.

DETAILED DESCRIPTION

Figure 1:
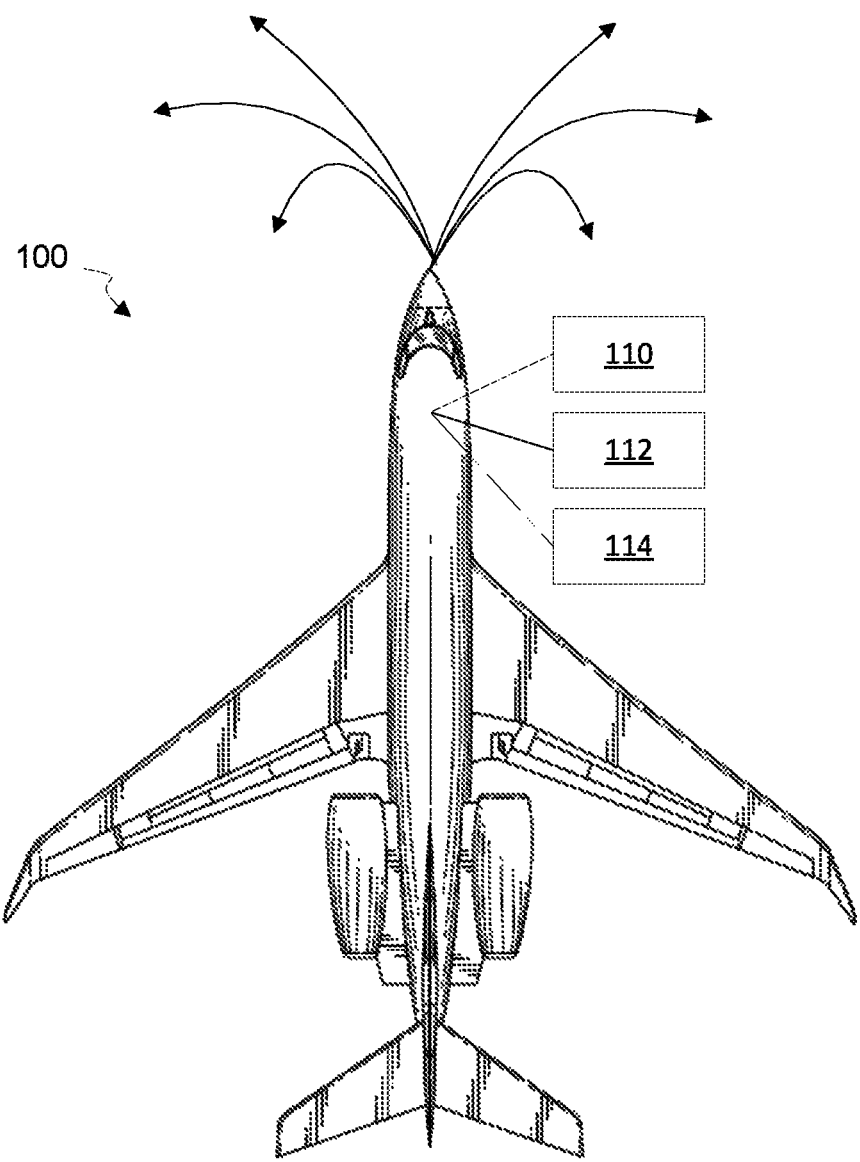
FIG. 1 is a schematic diagram illustrating an aircraft having a control system, in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Various embodiments disclosed herein describe systems that implement a Trajectory Prediction Algorithm (TPA) and a Recovery Autopilot. The TPA models various possible recovery trajectories and tests those trajectories against the aircraft limits and terrain clearance. The recovery trajectories represent flight paths that will potentially guide the aircraft away from impending aircraft limit violations or terrain conflicts. If a trajectory violates a limit, the trajectory will be ruled out and not used. When only one possible recovery is available and that recovery is approaching a limit, the TPA will trigger the Recovery Autopilot to initiate that recovery and thereby avoid the impending envelope exceedance or terrain conflict. Multiple trajectories are utilized to avoid false warnings. For example, if a right turn could be used to avoid terrain but the system does not model right turns, the system will trigger a recovery when the straight-ahead trajectory intersects the terrain. If the crew was safely planning the right turn, it would be a nuisance that the system activated unnecessarily when a safe route existed. The TPA models the recovery beginning from the current aircraft state using current aircraft performance capability. For example, the TPA uses energy modeling that is based on ambient temperature and engine failure status. The Recovery Autopilot takes control of the aircraft and executes the directed recovery once triggered.

Referring now to FIG. 1, an example of an aircraft 100 is illustrated in accordance with some embodiments. Aircraft 100 includes a control system 110, a sensor system 112, and an actuator system 114, among other systems. Although aircraft 100 is described in this description as an airplane, it should be appreciated that control system 110 may be utilized in other aircraft, land vehicles, water vehicles, space vehicles, or other machinery without departing from the scope of the present disclosure. For example, control system 110 may be utilized in submarines, helicopters, airships, spacecraft, or automobiles.

Control system 110 is an avionics system configured to operate aircraft 100 and to evaluate various trajectories 120a-f, as will be described in further detail below. Sensor system 112 includes one or more sensing devices that sense observable conditions of the exterior environment, the interior environment of aircraft 100, or operational conditions and status of aircraft 100. For example, sensor system 112 may include accelerometers, gyroscopes, RADARs, LIDARs, global positioning systems, optical cameras, thermal cameras, ultrasonic sensors, and/or other sensors.

Actuator system 114 includes one or more actuator devices that control one or more vehicle features. For example, actuator system 114 may include actuators that manipulate control surfaces on aircraft 100, extend or retract landing gear of aircraft 100, an/or move other components of aircraft 100.

Figure 2:
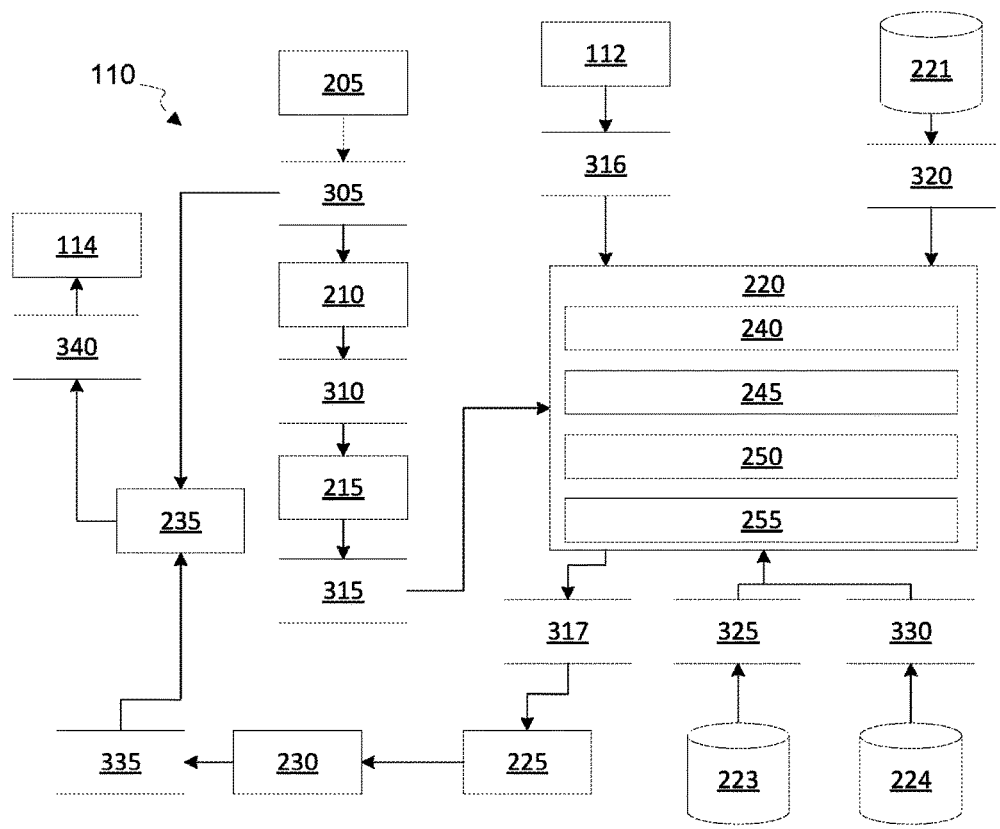
FIG. 2 is a dataflow diagram illustrating the control system of the aircraft of FIG. 1, in accordance with various embodiments.

Referring now to FIG. 2, and with continued reference to FIG. 1, control system 110 is illustrated in accordance with some embodiments. Control system 110 includes at least one processor and a computer readable storage device or media. The processor may be any custom made or commercially available processor, a central processing unit (CPU), a graphics processing unit (GPU), an auxiliary processor among several processors associated with control system 110, a semiconductor based microprocessor (in the form of a microchip or chip set), a macroprocessor, any combination thereof, or generally any device for executing instructions. The computer readable storage device or media may include volatile and nonvolatile storage in read-only memory (ROM), random-access memory (RAM), and keep-alive memory (KAM), for example. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by control system 110 in controlling aircraft 100.

The instructions may include one or more separate programs, each of which comprises an ordered listing of executable instructions for implementing logical functions. The instructions, when executed by the processor, receive and process signals from the sensor system, perform logic, calculations, methods and/or algorithms for automatically controlling the components of aircraft 100, and generate control signals for actuator system 114 to automatically control the components of aircraft 100 based on the logic, calculations, methods, and/or algorithms. Although only one control system 110 is shown in FIGS. 1-2, embodiments of aircraft 100 may include any number of control systems 110 that communicate over any suitable communication medium or a combination of communication mediums and that cooperate to process the sensor signals, perform logic, calculations, methods, and/or algorithms, and generate control signals to automatically control features of aircraft 100. In various embodiments, one or more instructions of control system, when executed by the processor, models possible recoveries of the aircraft and tests those recoveries for Mach limits, Calibrated Airspeed limits, Angle of Attack limits, and terrain conflicts.

In the example provided, control system 110 includes a flight management system 205, a potential path generation module 210, a trajectory selection module 215, a trajectory flight condition module 220, a terrain database 221, a climb ability database 223, an aircraft limit database 224, a limit comparison module 225, a violation indicator module 230, and a recovery autopilot module 235.

Flight Management System 205 (FMS 205) manages a flight plan, as will be appreciated by those with ordinary skill in the art. In the example provided, FMS 205 generates a potential landing indicator 305 when a flight plan/clearance for aircraft 100 indicates a potential landing. For example, when an airport is entered as a waypoint in FMS 205, then FMS 205 may generate the potential landing indicator 305 when aircraft 100 approaches the airport waypoint. It should be appreciated that other criteria and modules may be utilized to generate potential landing indicator 305. For example, other modules may generate potential landing indicator 305 when landing gear is extended, when a runway is within a threshold distance from aircraft 100, or when other conditions are met that suggest a flight crew may attempt to land aircraft 100.

Potential path generation module 210 is configured to generate a plurality of trajectories 310 from which trajectory selection module 215 selects a potential aircraft path relative to a current aircraft flight condition. Each of the potential aircraft paths corresponds to a potential recovery trajectory the aircraft may fly when other potential paths become undesirable.

In the example provided, potential path generation module 210 is configured to generate the plurality of trajectories to cover at least six different directions for a potential escape recovery, such as trajectories 120a-f. For example, trajectories 310 may include a straight-ahead path, a straight climb path, a left climb path, a right climb path, a left descend path, and a right descend path. As will be appreciated by those with ordinary skill in the art, the dangerously low speed hazard is most significant when in a nose high condition and the overspeed hazard is most significant in the nose low condition, so nose high recoveries and nose low recoveries are modeled to provide full envelope protection. It should be appreciated that additional or alternative paths may be utilized without departing from the scope of the present disclosure.

In the example provided, potential path generation module 210 generates both a left bank trajectory and a right bank trajectory using a balance between bank angle and severity of nose high attitude, as will be appreciated by those of ordinary skill in the art. In a nose low situation, elimination of aircraft bank aids in the recovery, yet in the nose high situation, the addition of bank aids in recovery. This balance is based on what a pilot would do. For example, if the aircraft was only slightly nose high, no bank at all may be the most appropriate recovery. Most pilots will balance the amount of bank used with severity of the nose high recovery such that the termination for the recovery is smooth. The potential path generation module 210 balances the bank angle based on creating the smoothest possible recovery without conflict between nose low and nose high cases.

Potential path generation module 210 is further configured to generate a landing path of the plurality of trajectories in response to a potential landing indicator. By including the landing path, control system 110 may continue to operate as described below even during landing without disabling the trajectory evaluation. Control system 110 stays active all the way to the runway by using a "safe landing inhibit." As the aircraft nears the approach end of the runway, the system will be inhibited from commanding a recovery for ground collision threat if a safe landing is indicated. In other words, while the landing path does not violate a limit, the landing path is available for the pilot to fly. This inhibit leverages the capabilities of conventional runway overrun protection systems to identify a safe approach to a runway. Unsafe approaches will not be inhibited and full protection is retained.

Trajectory selection module 215 is configured to select a potential aircraft path 315 of trajectories 310 for trajectory flight condition module to evaluate. In the example provided, trajectory selection module 215 evaluates each potential aircraft path of trajectories 310 in turn, and is configured to select a next consecutive trajectory of the plurality of trajectories as the potential aircraft path upon a completed evaluation of a previous potential path. Trajectory selection module 215 selects each potential path of trajectories 310 to fully evaluate each potential path aircraft 100 may take.

Trajectory flight condition module 220 is configured to estimate a modeled flight condition 317 of the aircraft along the potential aircraft path. The modeled flight condition may indicate the airspeed, pitch, roll, yaw, and other conditions that may be used to determine whether aircraft 100 violates the aircraft limits. In the example provided, trajectory flight condition module 220 includes a vertical velocity module 240, an energy state module 245, an airspeed prediction module 250, and a terrain conflict module 255. Trajectory flight condition module 220 receives sensor data 316 from sensor system 112.

Vertical velocity module 240 is configured to calculate a vertical velocity of the aircraft on the potential aircraft path. For example, vertical velocity module 240 may calculate the vertical velocity based on a vector velocity and a descent angle provided by sensor system 112.

Energy state module 245 is configured to calculate an energy state of the aircraft on the potential aircraft path. Energy modeling permits accurate prediction of Mach, Airspeed, and Angle of Attack along the potential aircraft path. Multiple trajectories executing in faster than real time can be taxing on the processor, so the energy modeling is performed using a simple, accurate, and fast algorithm.

Energy state module 245 is further configured to calculate the energy state based on a rate of climb of the aircraft at full power and on a rate of descent of the aircraft at idle power. Specifically, energy state module 245 utilizes interpolation between two parameters. The first parameter is the rate of climb at full power and the second is the rate of descent at idle power. These two parameters define the entire span of energy gain/loss of the aircraft. The parameters are computed using table lookup or simplified modeling based on current configuration and flight conditions.

Energy state module 245 is further configured to calculate the energy state based on a current power setting of the aircraft, a current power capability of the aircraft, a speedbrake position on the aircraft, landing gear and flap settings of the aircraft, and an engine health of the aircraft. For example, energy state module 245 may predict the future energy state of aircraft 100 by interpolating between the maximum climb rate and the idle power descent rate at specific temperatures or other conditions and accounting for the aircraft configuration. This ability to predict energy states permits accurate transition between nose high or nose low recovery and a steady climb final segment. By utilizing a maximum climb rate and idle descent rate based at least in part on engine failure status, control system 110 provides accurate predictions whether all engines are operating or if engine failure occurs. Since the transition between nose high recovery or nose low recovery and final segment climb is determined by energy state, control system 110 can accurately model a nose high recovery even while nose low. For example, if in level flight above the single-engine service ceiling and an engine fails while near an aircraft limit, control system 110 will predict and execute a nose high recovery even though the nose is level or nose low. This is because at level flight above the single engine service ceiling, the aircraft is energy deficient and should descend even to avoid terrain. In some embodiments, the system uses a constant energy plane and a constant altitude to distinguish between nose high unusual attitudes and nose low unusual attitude. Accordingly, control system 110 may accurately avoid terrain that is above the single engine service ceiling of the aircraft while the aircraft is conducting a single engine drift down maneuver, as will be appreciated by those of ordinary skill in the art.

Airspeed prediction module 250 is configured to estimate an airspeed of the aircraft on the potential aircraft path based on the vertical velocity and the energy state. For example, airspeed prediction module 250 may find the difference between climb capability and the vertical velocity, then use throttle position to calculate a change in airspeed.

In some embodiments, each trajectory is evaluated by looping the following algorithm:

```
Begin Loop
    Model Recovery Autopilot response
        Adjust aircraft state to reflect autopilot response
        Extend trajectory 1 time slice
        Compute vertical velocity based on model trajectory
        Compute energy gain/loss given current
        conditions/power/speedbrake)
        Adjust model energy based on vertical velocity and energy
        gain/loss
        Compute airspeed and Mach of new energy state
        Test new condition for limits violation
            Min Speed Limit
            Mach Limit
            Max Speed Limit
            Terrain Clearance
Loop until aircraft is clear
```

Terrain database 221 stores terrain data 320 for use by terrain conflict module 255. For example, terrain database 221 may utilize conventional commercially available terrain data that indicates the height and location of terrain. Terrain conflict module 255 is configured to determine whether the potential aircraft path indicates a terrain conflict.

Climb ability database 223 stores climb ability data 325. In the example provided, climb ability data 325 is the climb rate at full power and the descent rate at idle power of aircraft 100 at specific conditions, such as at specific temperatures and altitude.

Aircraft limit database 224 stores aircraft limit data 330. As used herein, the term "aircraft limit" means flight condition limits such as Mach limits, maximum airspeed limits, minimum airspeed limits, angle of attack limits, and other similar limits of aircraft performance. As used herein, the term "aircraft limit" specifically excludes terrain conflicts.

In the example provided, predetermined passenger comfort limits are the aircraft limits. For example, the limits are sufficiently aggressive to be nuisance free yet still provide protection while preventing injury to unsecured passengers. The recovery relies on auto-pilot like maneuvers with roll onset rates constrained and limited g-loading to prevent large lateral and vertical accelerations in the cabin. Use of bank during the recovery aids in minimizing nuisances without imposing additional accelerations on the passengers.

In some embodiments, aircraft capability limits are the aircraft limits. For example, the aircraft capability limits permit greater accelerations and loading than are permitted by passenger comfort limits.

Limit comparison module 225 is configured to determine whether the modeled flight condition violates aircraft limits. For example, if an airspeed of aircraft 100 along the potential path is indicated as exceeding a maximum airspeed of the aircraft limits, then limit comparison module 225 will determine that the modeled flight condition violates aircraft limits.

Violation indicator module 230 is configured to generate an indication of impending violation 335 based on the limit comparison. In the example provided, violation indicator module 230 is further configured to generate the indication of impending violation based on the terrain conflict. In some embodiments, the indication of impending violation 335 may be conveyed to the flight crew by visual representation on a display in a flight deck of aircraft 100.

Recovery autopilot module 235 is configured to guide the aircraft along the selected trajectory in response to the selected trajectory being a last trajectory of the plurality of trajectories to lack a violation indication. For example, if five of six modeled trajectories have an indication of violation, recovery autopilot module 235 will command aircraft 100 to fly along the remaining modeled trajectory when that trajectory has an indication of impending violation. To command the flight, recovery autopilot module 235 may send control commands 340 to actuator system 114 to manipulate control surfaces of aircraft 100.

As will be appreciated by those of ordinary skill in the art, if the aircraft experiences a serious upset from windshear or other factors that place the aircraft in a near inverted case while at extreme bank angles, control system 110 is configured to determine which way to roll out for recovery by generating potential paths for each direction. For example, if in right bank but nearly inverted and still rolling right, control system 110 will evaluate a potential path that rolls through the inverted attitude to wings level. Control system 110 then commences a nose low recovery, arresting the roll and initiating roll in the shorted direction to commence the recovery. By commanding the selected trajectory, control system 110 ensures that the evaluated trajectory is the recovery flown by aircraft 100. For example, when the recovery trajectory predicts a roll through recovery, the recovery autopilot executes a roll-through recovery rather than a non-roll through recovery.

In the example provided, recovery autopilot module 235 is configured to guide the aircraft using the algorithm:

---

If Nose high (Losing Speed) or Insufficient Maneuver margin:
    Commanded g = 0.8 g
    Commanded Bank = +60/−60 (as directed by TPA) Until Rollout Point
    Commanded Power = Full
    Commanded Speedbrake = retract
If Nose Low (Gaining Speed)
    Commanded g = 1.2 g (0.8 g if bank >90)
    Commanded Bank = 0 (roll through in TPA directed direction)
    Commanded Power = Idle
    Commanded Speedbrake = Hold
Speed Constant (within desired margin)
    Commanded g = Speed on elevator for Vclimb
    Commanded Bank = −30, 0, +30 (as directed by TPA)
    Commanded Power = Full
    Commanded Speedbrake = retract

---

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An avionics system for an aircraft, the avionics system comprising:
    a trajectory selection module configured to select a potential aircraft path relative to a current aircraft flight condition;
    a trajectory flight condition module configured to estimate a modeled flight condition of the aircraft along the potential aircraft path, wherein the trajectory flight condition module comprises:
        a vertical velocity module configured to calculate a vertical velocity of the aircraft on the potential aircraft path;
        an energy state module configured to calculate an energy state of the aircraft on the potential aircraft path; and
        an airspeed prediction module configured to estimate an airspeed of the aircraft on the potential aircraft path based on the vertical velocity and the energy state;
    a limit comparison module configured to determine whether the modeled flight condition violates an aircraft limit; and
    a violation indicator module configured to generate an indication of impending violation.

2. The avionics system of claim 1, wherein the energy state module is further configured to calculate the energy state based on a rate of climb of the aircraft at full power and on a rate of descent of the aircraft at idle power.

3. The avionics system of claim 2, wherein the energy state module is further configured to calculate the energy state based on a current power setting of the aircraft, a current power capability of the aircraft, a speedbrake position on the aircraft, a landing gear setting, a flap setting, and an engine health of the aircraft.

4. An avionics system for an aircraft, the avionics system comprising:

a trajectory selection module configured to select a potential aircraft path relative to a current aircraft flight condition;
a trajectory flight condition module configured to estimate a modeled flight condition of the aircraft along the potential aircraft path;
a limit comparison module configured to determine whether the modeled flight condition violates an aircraft limit;
a violation indicator module configured to generate an indication of impending violation; and
a potential path generation module configured to generate a plurality of trajectories from which the trajectory selection module selects the potential aircraft path, wherein the trajectory selection module is configured to select a next consecutive trajectory of the plurality of trajectories as the potential aircraft path upon a completed evaluation of a previous potential path.

5. The avionics system of claim 4, wherein the potential path generation module is further configured to generate the plurality of trajectories to cover at least six different directions for a potential escape recovery.

6. The avionics system of claim 4, wherein the potential path generation module is further configured to generate a landing path of the plurality of trajectories in response to a potential landing indicator, wherein the limit comparison module is configured to determine whether the aircraft will violate the aircraft limit by following the landing path.

7. The avionics system of claim 6, further comprising a recovery autopilot configured to guide the aircraft along the potential aircraft path in response to the potential aircraft path being a last trajectory of the plurality of trajectories to lack a violation indication.

8. The avionics system of claim 1, wherein the limit comparison module is configured to determine whether the modeled flight condition violates a predetermined passenger comfort limit as the aircraft limit.

9. The avionics system of claim 1, wherein the limit comparison module is configured to determine whether the modeled flight condition violates a capability limit as the aircraft limit.

10. The avionics system of claim 1, further comprising a terrain conflict module configured to determine whether the potential aircraft path indicates a terrain conflict, and wherein the violation indication module is further configured to generate the indication of impending violation based on the terrain conflict.

11. An aircraft comprising:
a sensor system configured to provide aircraft flight condition data;
an actuator system configured to manipulate control surfaces of the aircraft; and
a control system comprising:
    a trajectory selection module configured to select a potential aircraft path relative to a current aircraft flight condition;
    a trajectory flight condition module configured to estimate a modeled flight condition of the aircraft along the potential aircraft path, wherein the trajectory flight condition module comprises:
        a vertical velocity module configured to calculate a vertical velocity of the aircraft on the potential aircraft path;
        an energy state module configured to calculate an energy state of the aircraft on the potential aircraft path; and
        an airspeed prediction module configured to estimate an airspeed of the aircraft on the potential aircraft path based on the vertical velocity and the energy state;
    a limit comparison module configured to determine whether the modeled flight condition violates an aircraft limit; and
    a violation indicator module configured to generate an indication of impending violation.

12. The aircraft of claim 11, wherein the energy state module is further configured to calculate the energy state based on a rate of climb of the aircraft at full power and on a rate of descent of the aircraft at idle power.

13. The aircraft of claim 12, wherein the energy state module is further configured to calculate the energy state based on a current power setting of the aircraft, a current power capability of the aircraft, a speedbrake position on the aircraft, a landing gear setting, a flap setting, and an engine health of the aircraft.

14. An aircraft comprising:
a sensor system configured to provide aircraft flight condition data;
an actuator system configured to manipulate control surfaces of the aircraft; and
a control system comprising:
    a trajectory selection module configured to select a potential aircraft path relative to a current aircraft flight condition;
    a trajectory flight condition module configured to estimate a modeled flight condition of the aircraft along the potential aircraft path;
    a limit comparison module configured to determine whether the modeled flight condition violates an aircraft limit;
    a violation indicator module configured to generate an indication of impending violation; and
    a potential path generation module configured to generate a plurality of trajectories from which the trajectory selection module selects the potential aircraft path, wherein the trajectory selection module is configured to select a next consecutive trajectory of the plurality of trajectories as the potential aircraft path upon a completed evaluation of a previous potential path.

15. The aircraft of claim 14, wherein the potential path generation module is further configured to generate the plurality of trajectories to cover at least six different directions for a potential escape recovery.

16. The aircraft of claim 14, wherein the potential path generation module is further configured to generate a landing path of the plurality of trajectories in response to a potential landing indicator, wherein the limit comparison module is configured to determine whether the aircraft will violate the aircraft limit by following the landing path.

17. The aircraft of claim 16, wherein the control system further comprises a recovery autopilot configured to guide the aircraft along the potential aircraft path in response to the potential aircraft path being a last trajectory of the plurality of trajectories to lack a violation indication.

18. The aircraft of claim 11, wherein the limit comparison module is configured to determine whether the modeled flight condition violates a predetermined passenger comfort limit as the aircraft limit.

19. The aircraft of claim 14, wherein the limit comparison module is configured to determine whether the modeled flight condition violates a predetermined passenger comfort limit as the aircraft limit.

20. The avionics system of claim 4, wherein the limit comparison module is configured to determine whether the modeled flight condition violates a predetermined passenger comfort limit as the aircraft limit.

21. The avionics system of claim 4, wherein the limit comparison module is configured to determine whether the modeled flight condition violates a capability limit as the aircraft limit.

22. The avionics system of claim 4, further comprising a terrain conflict module configured to determine whether the potential aircraft path indicates a terrain conflict, and wherein the violation indication module is further configured to generate the indication of impending violation based on the terrain conflict.

23. An avionics system for an aircraft, the avionics system comprising:
   means for selecting a potential aircraft path relative to a current aircraft flight condition;
   means for estimating a modeled flight condition of the aircraft along the potential aircraft path, wherein the means for estimating a modeled flight condition of the aircraft along the potential path comprises:
      means for calculating a vertical velocity of the aircraft on the potential aircraft path;
      means for calculating an energy state of the aircraft on the potential aircraft path; and
      means for estimating an airspeed of the aircraft on the potential aircraft path based on the vertical velocity and the energy state; and
   means for determining whether the modeled flight condition violates an aircraft limit; and
   means for generating an indication of impending violation.

24. An avionics system for an aircraft, the avionics system comprising:
   means for selecting a potential aircraft path relative to a current aircraft flight condition;
   means for estimating a modeled flight condition of the aircraft along the potential aircraft path;
   means for determining whether the modeled flight condition violates an aircraft limit;
   means for generating an indication of impending violation; and
   means for generating a plurality of trajectories from which to select the potential aircraft path, wherein the means for generating a plurality of trajectories is configured to select a next consecutive trajectory of the plurality of trajectories as the potential aircraft path upon a completed evaluation of a previous potential path.

25. An aircraft comprising:
means for providing aircraft flight condition data;
means for manipulating control surfaces of the aircraft; and
means for:
   selecting a potential aircraft path relative to a current aircraft flight condition;
   estimating a modeled flight condition of the aircraft along the potential aircraft path, comprising:
      calculating a vertical velocity of the aircraft on the potential aircraft path;
      calculating an energy state of the aircraft on the potential aircraft path; and
      estimating an airspeed of the aircraft on the potential aircraft path based on the vertical velocity and the energy state;
   determining whether the modeled flight condition violates an aircraft limit; and
   generating an indication of impending violation.

26. An aircraft comprising:
means for providing aircraft flight condition data;
means for manipulating control surfaces of the aircraft; and
means for:
   selecting a potential aircraft path relative to a current aircraft flight condition;
   estimating a modeled flight condition of the aircraft along the potential aircraft path;
   determining whether the modeled flight condition violates an aircraft limit;
   generating an indication of impending violation; and
   generating a plurality of trajectories from which to select the potential aircraft path, wherein generating a plurality of trajectories includes selecting a next consecutive trajectory of the plurality of trajectories as the potential aircraft path upon a completed evaluation of a previous potential path.

* * * * *